(12) United States Patent
Kim et al.

(10) Patent No.: US 11,247,534 B2
(45) Date of Patent: Feb. 15, 2022

(54) METHOD OF CONTROLLING COMPRESSOR

(71) Applicant: Hanon Systems, Daejeon (KR)

(72) Inventors: Hong Min Kim, Daejeon (KR); Kweon Soo Lim, Daejeon (KR); Soo Cheol Jeong, Daejeon (KR)

(73) Assignee: Hanon Systems, Daejeon (KR)

(*) Notice: Subject to any disclaimer, the term of this patent is extended or adjusted under 35 U.S.C. 154(b) by 71 days.

(21) Appl. No.: 16/647,116

(22) PCT Filed: Oct. 2, 2018

(86) PCT No.: PCT/KR2018/011675
§ 371 (c)(1),
(2) Date: Mar. 13, 2020

(87) PCT Pub. No.: WO2019/074231
PCT Pub. Date: Apr. 18, 2019

(65) Prior Publication Data
US 2020/0276884 A1 Sep. 3, 2020

(30) Foreign Application Priority Data

Oct. 12, 2017 (KR) .................. 10-2017-0132342

(51) Int. Cl.
*B60H 1/32* (2006.01)
*B60H 1/00* (2006.01)

(52) U.S. Cl.
CPC ....... *B60H 1/3214* (2013.01); *B60H 1/00978* (2013.01); *B60H 1/3225* (2013.01);
(Continued)

(58) Field of Classification Search
CPC .............. B60H 1/3214; B60H 1/00978; B60H 1/3225; B60H 2001/3238;
(Continued)

(56) References Cited

U.S. PATENT DOCUMENTS

| | | | | |
|---|---|---|---|---|
| 5,765,994 A | * | 6/1998 | Barbier | F04B 39/0207 250/577 |
| 2007/0006608 A1 | * | 1/2007 | Lee | G01F 23/76 62/468 |
| 2010/0050673 A1 | * | 3/2010 | Hahn | F25B 49/022 62/193 |

FOREIGN PATENT DOCUMENTS

JP H11123930 A 5/1999
JP 2017081417 A 5/2017
(Continued)

OTHER PUBLICATIONS

International Search Report issued in PCT/KR2018/011675 dated Jan. 17, 2019.

*Primary Examiner* — Marc E Norman
(74) *Attorney, Agent, or Firm* — Norton Rose Fulbright US LLP; James R. Crawford

(57) ABSTRACT

The present disclosure relates to a method of controlling a compressor, and may include: pilot driving which drives a compressor of an air conditioner by receiving a start signal; determining whether oil is short which compares the oil amount of the compressor, driven in the pilot driving, with a predetermined reference oil amount; normal driving which maintains the driving of the compressor when it is determined that the oil amount is the reference oil amount or more; and stopping which stops the driving of the compressor when it is determined that the oil amount is smaller than the reference oil amount. Accordingly, by stopping the compressor when the oil is short, it is possible to prevent damage to the compressor.

14 Claims, 3 Drawing Sheets

(52) U.S. Cl.
 CPC ............... *B60H 2001/3238* (2013.01); *B60H 2001/3263* (2013.01)

(58) Field of Classification Search
 CPC ......... B60H 2001/3263; F25B 2500/16; F25B 2700/2117; F25B 2700/21175
 See application file for complete search history.

(56) References Cited

FOREIGN PATENT DOCUMENTS

| | | |
|---|---|---|
| KR | 20080015316 A | 2/2008 |
| KR | 101207600 B1 | 12/2012 |
| KR | 20130022278 A | 3/2013 |

\* cited by examiner

METHOD OF CONTROLLING COMPRESSOR

This application is a national phase under 35 U.S.C. § 371 of International Application No. PCT/KR2018/011675 filed Oct. 2, 2018, which claims the benefit of priority from Korean Patent Application No. 10-2017-0132342 filed Oct. 12, 2017, each of which is hereby incorporated herein by reference in its entirety for all purposes.

TECHNICAL FIELD

The present disclosure relates to a method of controlling a compressor, and more particularly, to a method of controlling a compressor, capable of stopping a compressor when the oil in the compressor is short.

BACKGROUND ART

Generally, an Air Conditioner (A/C) for cooling and heating the interior of a vehicle is installed in the vehicle. As illustrated in FIG. 1, such an air conditioner includes a vapor compression refrigeration cycle mechanism having a compressor 1 which compresses a low-temperature, low-pressure gaseous refrigerant to a high-temperature, high-pressure gaseous refrigerant, a condenser 2 which condenses the high-temperature, high-pressure gaseous refrigerant, which is discharged from the compressor 1, to the low-temperature, high-pressure liquid refrigerant, an expansion valve 3 which expands the low-temperature, high-pressure liquid refrigerant, which is discharged from the condenser 2, to the low-temperature, low-pressure liquid refrigerant, and an evaporator 4 which evaporates the low-temperature, low-pressure liquid refrigerant, which is discharged from the expansion valve 3, to the low-temperature, low-pressure gaseous refrigerant.

In the air conditioner for a vehicle according to such a configuration, when a start signal is input, the compressor is driven to compress the refrigerant, and the refrigerant which is discharged from the compressor circulates the condenser, the expansion valve, and the evaporator and is recovered to the compressor; the condenser and the evaporator are heat-exchanged with the air; and a part of the air which is heat-exchanged with the condenser and the evaporator is supplied to a passenger compartment of the vehicle to provide cooling, heating, and dehumidification.

Here, the conventional method of controlling the compressor includes: driving a compressor by receiving a start signal; and stopping the compressor by receiving an end signal.

However, in such a conventional method of controlling the compressor, there has been a problem in that the compressor is driven even when the oil stored in the compressor is short for lubricating a sliding part of the compressor, thereby causing damage to the compressor. Specifically, when the vehicle is left in an external environment having a large daily temperature difference for a long time, the movement of the refrigerant and the oil occurs in the refrigeration cycle by the daily temperature difference. That is, a migration phenomenon occurs. However, the oil having a relatively large viscosity, between the refrigerant and the oil which are moved from the compressor to the condenser, the expansion valve, and the evaporator, does not flow back into the compressor, resulting in a shortage state in which the oil amount in the compressor is smaller than a predetermined reference oil amount. There occurs a problem in that when the compressor is driven in such an oil shortage state, the friction of the sliding part is increased and sticking occurs, thereby causing damage to the compressor, and the conventional method of controlling the compressor has been configured to drive the compressor without considering the oil amount of the compressor.

DISCLOSURE

Technical Problem

Accordingly, an object of the present disclosure is to provide a method of controlling a compressor, capable of stopping the compressor when the oil is short.

Technical Solution

For achieving the object, the present disclosure provides a method of controlling a compressor, including: executing pilot driving which drives a compressor of an air conditioner by receiving a start signal; determining whether oil is short which compares the oil amount of the compressor, driven in the pilot driving, with a predetermined reference oil amount; executing normal driving which maintains the driving of the compressor when it is determined that the oil amount is the reference oil amount or more; and stopping the driving of the compressor when it is determined that the oil amount is smaller than the reference oil amount.

The determining of whether the oil is short may include determining an evaporator temperature which compares a temperature change value in an evaporator of the air conditioner with a predetermined first reference temperature.

The temperature change value may be calculated by subtracting the temperature of the refrigerant, which is measured at the outlet of the evaporator at a time point of performing a comparison in the determining of the evaporator temperature, from the temperature of the refrigerant, which is measured at the outlet of the evaporator at a start time point of the pilot driving.

The determining of whether the oil is short may further include determining a pilot driving time period which compares a pilot driving time period of the compressor, driven in the pilot driving, with a predetermined first reference time period, and the determining of the pilot driving time period may be executed earlier than the determining of the evaporator temperature.

The pilot driving time period may be set to a time period from a start time point of the pilot driving to a time point of performing a comparison in the determining of the pilot driving time period.

The determining of the evaporator temperature may be executed, when it is determined in the determining of the pilot driving time period that the pilot driving time period is equal to or longer than the first reference time period; it may be determined that the oil amount is the reference oil amount or more when it is determined in the determining of the evaporator temperature that the temperature change value is the first reference temperature or more, and the normal driving may be executed; and it may be determined that the oil amount is smaller than the reference oil amount when it is determined in the determining of the evaporator temperature that the temperature change value is smaller than the first reference temperature, and the stopping may be executed.

The determining of the evaporator temperature may be executed, when it is determined in the determining of the pilot driving time period that the pilot driving time period is equal to or longer than the first reference time period;

determining a first pressure, which compares a system pressure between a condenser and an expansion valve of the air conditioner with a predetermined first reference pressure, may be executed, when it is determined in the determining of the evaporator temperature that the temperature change value is the first reference temperature or more; it may be determined that the oil amount is smaller than the reference oil amount when it is determined in the determining of the evaporator temperature that the temperature change value is smaller than the first reference temperature, and the stopping may be executed; it may be determined that the oil amount is the reference oil amount or more when it is determined in the determining of the first pressure that the system pressure exceeds the first reference pressure, and the normal driving may be executed; and it may be determined that the oil amount is smaller than the reference oil amount when it is determined in the determining of the first pressure that the system pressure is the first reference pressure or less, and the stopping may be executed.

The system pressure may be set to the pressure of the refrigerant which is discharged from the condenser to flow into the expansion valve.

The determining of the pilot driving time period may be executed again when it is determined in the determining of the pilot driving time period that the pilot driving time period is shorter than the first reference time period.

The method may further include determining whether the shortage of the oil is eliminated which compares the oil amount of the compressor whose driving is stopped in the stopping with the reference oil amount; the determining of whether the shortage of the oil is eliminated may include determining a stop time period which compares a stop time period of the compressor whose driving is stopped in the stopping with a predetermined second reference time period; and determining a second pressure which compares the system pressure between the condenser and the expansion valve of the air conditioner with a predetermined second reference pressure; and the determining of the stop time period may be executed earlier than determining the outside air temperature and the determining of the second pressure.

The stop time period may be set to a time period from a start time point of the stopping to a time point of performing a comparison in the determining of the stop time period.

The determining of the second pressure may be executed, when it is determined in the determining of the stop time period that the stop time period is equal to or longer than the second reference time period; it may be determined that the oil amount is the reference oil amount or more when it is determined in the determining of the second pressure that the system pressure is the second reference pressure or more, and the normal driving may be executed; and it may be determined that the oil amount is smaller than the reference oil amount when it is determined in the determining of the second pressure that the system pressure is smaller than the second reference pressure, and the process may return to the stopping.

The process may return to the stopping when it is determined in the determining of the stop time period that the stop time period is shorter than the second reference time period.

Advantageous Effects

The method of controlling the compressor according to the present disclosure may include: the pilot driving which drives the compressor of the air conditioner by receiving the start signal; the determining of whether the oil is short which compares the oil amount of the compressor, driven in the pilot driving, with the predetermined reference oil amount; the normal driving which maintains the driving of the compressor when it is determined that the oil amount is the reference oil amount or more; and stopping which stops the driving of the compressor when it is determined that the oil amount is smaller than the reference oil amount. Accordingly, by stopping the compressor when the oil is short, it is possible to prevent the damage to the compressor.

BEST MODE

Hereinafter, a method of controlling a compressor according to the present disclosure will be described in detail with reference to the accompanying drawings.

Figure 1:
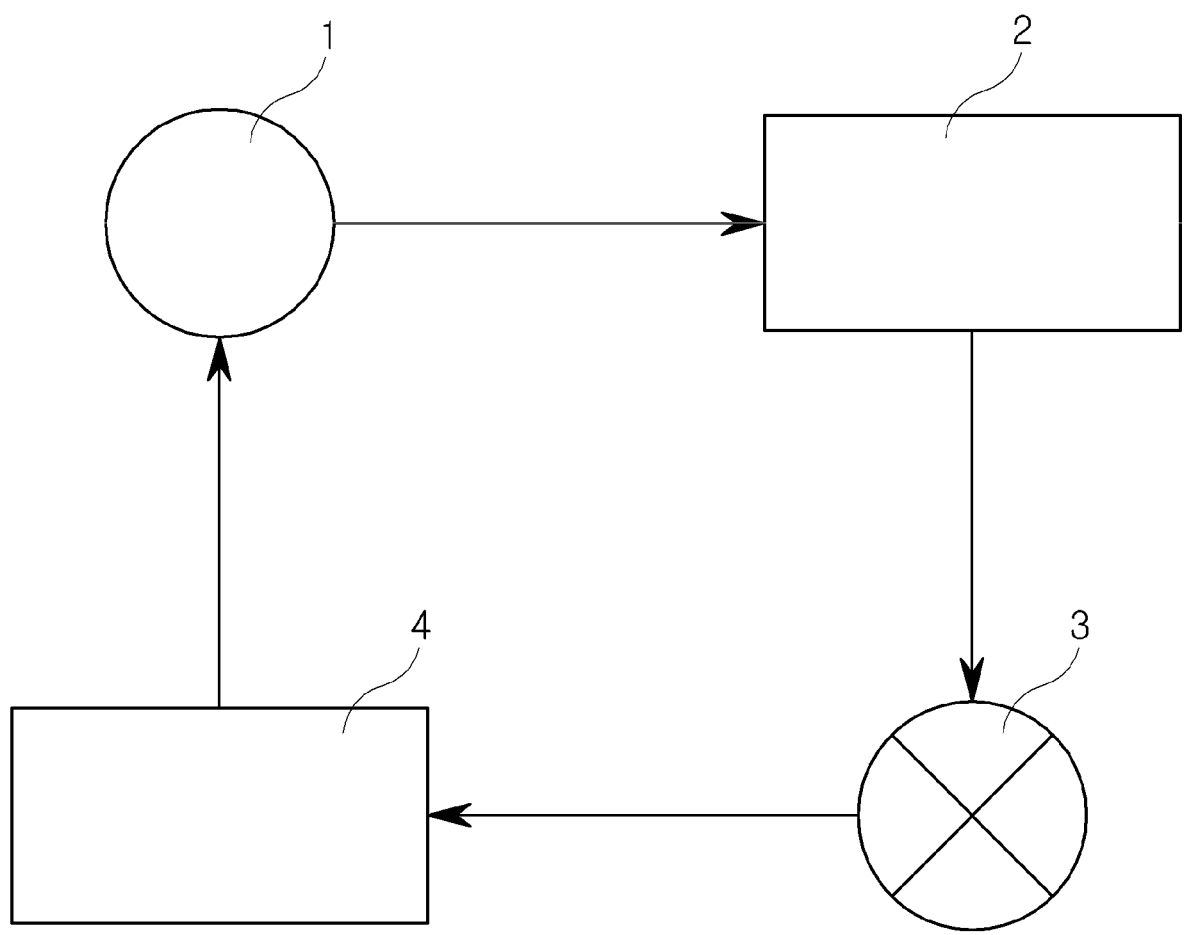
FIG. 1 is a systematic diagram illustrating a configuration of a general air conditioner.
Figure 2:
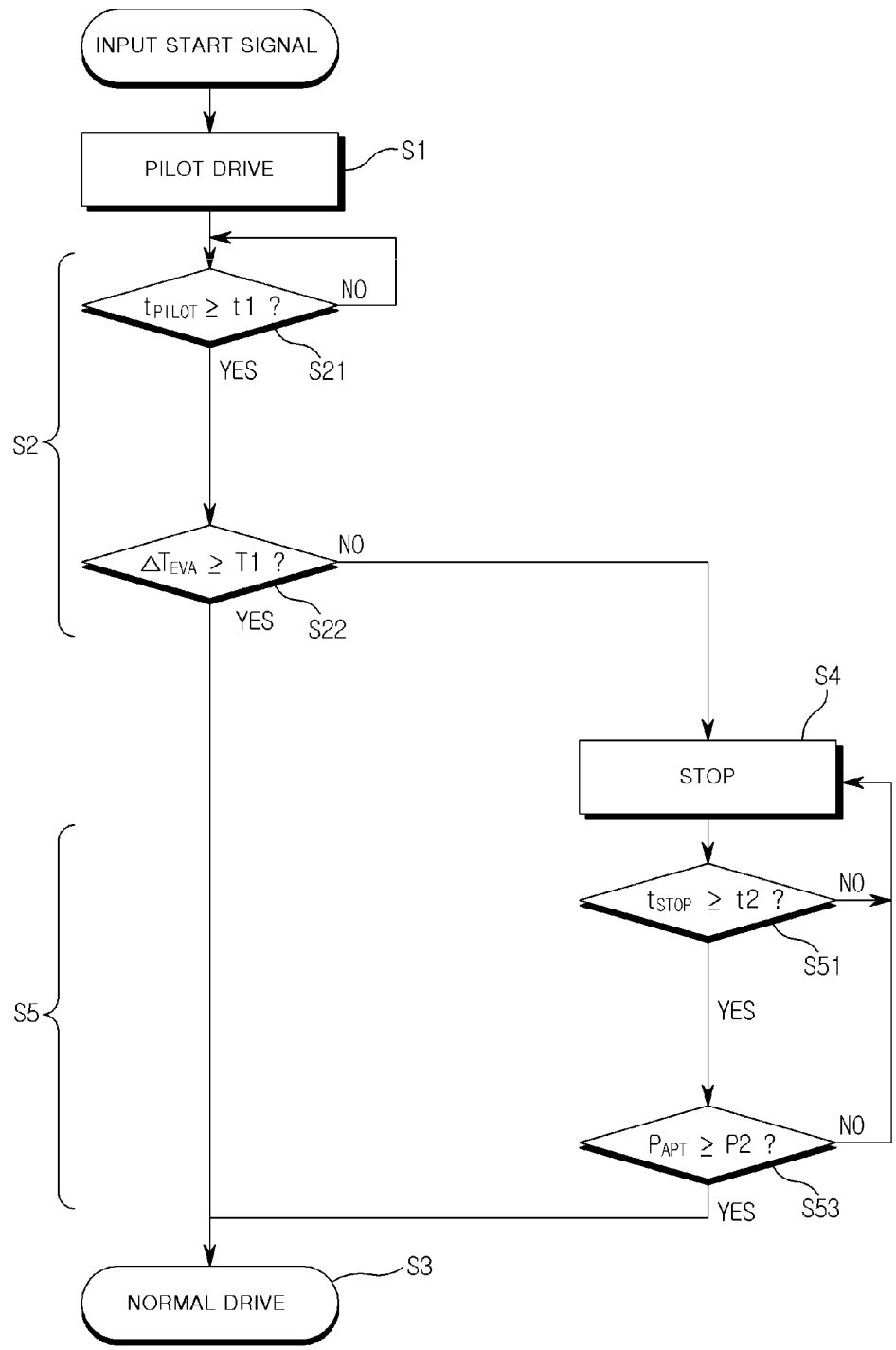
FIG. 2 is a flowchart illustrating a method of controlling a compressor according to an embodiment of the present disclosure.

FIG. 2 is a flowchart illustrating a method of controlling a compressor according to an embodiment of the present disclosure.

Referring to FIG. 2, a method of controlling a compressor according to an embodiment of the present disclosure may include pilot driving which drives a compressor of an air conditioner by receiving a start signal (S1); determining whether oil is short which compares the oil amount of the compressor, driven in the pilot driving (S1), with a predetermined reference oil amount (S2); normal driving which maintains the driving of the compressor when it is determined that the oil amount is the reference oil amount or more (S3); stopping which stops the driving of the compressor when it is determined that the oil amount is smaller than the reference oil amount (S4); and determining whether the shortage of the oil is eliminated which compares the oil amount of the compressor which is stopped in the stopping (S4) with the reference oil amount (S5).

The determining of whether the oil is short (S2) may include determining an evaporator temperature (S22) which compares a temperature change value (TEVA) in the evaporator of the air conditioner with a predetermined first reference temperature (T1).

In addition, the determining of whether the oil is short (S2) may further include determining a pilot driving time period which compares a pilot driving time period (tPILOT) of the compressor, driven in the pilot driving (S1), with a predetermined first reference time period (t1) so that the compressor may be driven sufficiently to the extent capable of accurately performing the determination in the determining of the evaporator temperature (S22), and the determining of the pilot driving time period (S21) may be configured to be executed earlier than the determining of the evaporator temperature (S22).

In addition, the determining of whether the oil is short (S2) may be configured so that the determining of the evaporator temperature (S22) is executed when it is determined in the determining of the pilot driving time period (S21) that the pilot driving time period (tPILOT) is equal to or longer than the first reference time period (t1); it is determined that the oil amount is the reference oil amount or more when it is determined in the determining of the evaporator temperature (S22) that the temperature change value (TEVA) is the first reference temperature (T1) or more, and the normal driving (S3) is executed; and it is determined that the oil amount is smaller than the reference oil amount when it is determined in the determining of the evaporator temperature (S22) that the temperature change value (TEVA) is smaller than the first reference temperature (T1), and the stopping (S4) is executed.

In addition, the determining of whether the oil is short (S2) may be configured so that the determining of the pilot driving time period (S21) is executed again when it is determined in the determining of the pilot driving time period (S21) that the pilot driving time period (tPILOT) is shorter than the first reference time period (t1).

Here, the temperature change value (TEVA) may be calculated by subtracting the temperature of the refrigerant, which is measured at the outlet of the evaporator at a time point of performing a comparison in the determining of the evaporator temperature (S22), from the temperature of the refrigerant, which is measured at the outlet of the evaporator at a start time point of the pilot driving (S1).

In addition, the reason why it is determined that the oil amount is the reference oil amount or more when it is determined that the temperature change value (TEVA) is the first reference temperature (T1) or more is because the compressor is normally operated when the oil amount is sufficient, and the temperature of the refrigerant which is measured at the outlet of the evaporator is lowered when the compressor is normally operated.

In addition, the pilot driving period (tPILOT) may be set to a time period from the start time point of the pilot driving (S1) to the time period of performing the comparison in the determining of the pilot driving time period (S21).

Determining whether the shortage of the oil is eliminated (S5) may include determining a second pressure (S53) which compares a system pressure (PAPT) with a predetermined second reference pressure (P2).

In addition, the determining of whether the shortage of the oil is eliminated (S5) may further include determining a stop time period (S51) which compares a stop time period (tSTOP) of the compressor which is stopped in the stopping (S4) with a predetermined second reference time period (t2) so that the compressor may be sufficiently stopped to the extent capable of accurately performing the determination in the determining of the second pressure (S53), and the determining of the stop time period (S51) may be configured to be executed earlier than the determining of the second pressure (S53).

In addition, the determining of whether the shortage of the oil is eliminated (S5) may be configured so that the determining of the second pressure (S53) is executed when it is determined that the stop time period (tSTOP) is equal to or longer than the second reference time period (t2) in the determining of the stop time period (S51); it is determined that the oil amount is the reference oil amount or more when it is determined in the determining of the second pressure (S53) that the system pressure (PAPT) is the second reference pressure (P2) or more, and the normal driving (S3) is executed; and it is determined that the oil amount is smaller than the reference oil amount when it is determined in the determining of the second pressure (S53) that the system pressure (PAPT) is smaller than the second reference pressure (P2), and the process returns to the stopping (S4).

In addition, the determining of whether the shortage of the oil is eliminated (S5) may be configured so that the process returns to the stopping (S4) when it is determined in the determining of the stop time period (S51) that the stop time period (tSTOP) is shorter than the second reference time period (t2).

Here, the second reference pressure (P2) may be preferably set to the first reference pressure (P1).

In addition, the stop time period (tSTOP) is a time period of waiting so that the oil flows back into the compressor from a condenser, an expansion valve, and the evaporator by the pilot driving, and may be set to a time period from a start time point of the stopping (S4) to a time point of performing a comparison in the determining of the stop time period (S51).

Here, as the method of controlling the compressor according to the present embodiment includes the pilot driving (S1), the determining of whether the oil is short (S2), the normal driving (S3), and the stopping (S4), it is possible to check whether the oil is short after the compressor is initially driven, continue to drive the compressor when it is determined that the oil is sufficient, and stop the compressor when it is determined that the oil is short, thereby preventing an increase in friction of a sliding part and the occurrence of sticking and damage to the compressor.

In addition, as the method of controlling the compressor according to the present embodiment includes the determining of whether the shortage of the oil is eliminated (S5), it is possible to check whether the oil shortage phenomenon is eliminated after the compressor is stopped, continue to stop the compressor when the oil shortage phenomenon is not eliminated, and operate the compressor again when the oil shortage phenomenon is eliminated, thereby minimizing the inconvenience, which is caused by stopping the air conditioning, while preventing the damage to the compressor.

Figure 3:
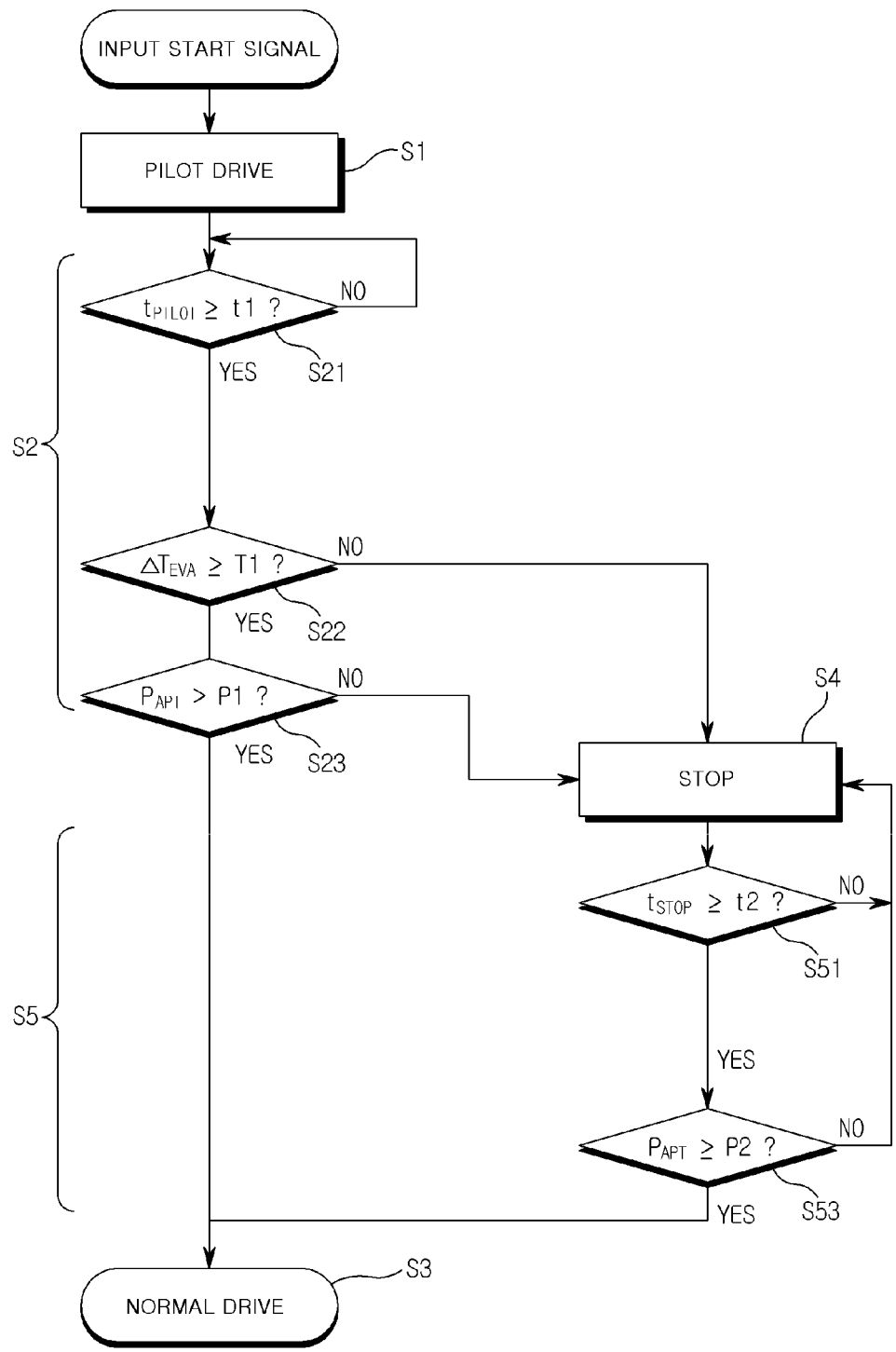
FIG. 3 is a flowchart illustrating a method of controlling a compressor according to another embodiment of the present disclosure.

Meanwhile, in the present embodiment, the determining of whether the oil is short (S2) includes the determining of the evaporator temperature (S22), but as illustrated in FIG. 3, the determining of whether the oil is short (S2) may further include determining of a first pressure (S23) which compares the system pressure (PAPT) between the condenser and the expansion valve of the air conditioner with the predetermined first reference pressure (P1). In addition, the determining of whether the oil is short (S2) may be configured to proceed to the normal driving (S3) when it is determined in all of the determining of the evaporator temperature (S22) and the determining of the first pressure (S23) that the oil is sufficient, and proceed to the stopping (S4) when it is determined only in any one of the determining of the evaporator temperature (S22) and the determining of the first pressure (S23) that the oil is short. That is, the determining of whether the oil is short (S2) may be configured so that the determining of the evaporator temperature (S22) is executed when it is determined in the determining of the pilot driving time period (S21) that the pilot driving time period (tPILOT) is equal to or longer than the first reference time period (t1); the determining of the first pressure (S23) is executed when it is determined in the determining of the evaporator temperature (S22) that the temperature change value (TEVA) is the first reference temperature (T1) or more; it is determined that the oil amount is the reference oil amount or more when it is determined in the determining of the first pressure (S23) that the system pressure (PAPT) exceeds the first reference pressure (P1), and the normal driving (S3) is executed; and it is determined that the oil amount is smaller than the reference oil amount when it is determined in the determining of the evaporator temperature (S22) that the temperature change value (TEVA) is smaller than the first reference temperature (T1) or when it is determined in the determining of the first pressure (S23) that the system pressure (PAPT) is the first reference pressure (P1) or less, and the stopping (S4) is executed. In this case, it is possible to prevent the damage to the compressor more effectively.

Here, the system pressure (PAPT) may be set to the pressure of the refrigerant which is discharged from the condenser to flow into the expansion valve. In addition, the reason why it is determined that the oil amount is the reference oil amount or more when it is determined that the system pressure (PAPT) exceeds the first reference pressure (P1) is because the compressor is normally operated when the oil amount is sufficient, and the system pressure increases when the compressor is normally operated. However, unlike the temperature change value (TEVA), since the system pressure may increase even if the compressor is not normally operated, determining whether the compressor is normally operated by determining the system pressure may be preferably utilized as an auxiliary means.

INDUSTRIAL APPLICABILITY

The present disclosure provides the method of controlling the compressor, capable of stopping the compressor when the oil in the compressor is short.

The invention claimed is:

1. A method of controlling a compressor, the method comprising:
    pilot driving which drives a compressor of an air conditioner by receiving a start signal;
    determining whether oil is short which compares the oil amount of the compressor, driven in the pilot driving, with a predetermined reference oil amount;
    normal driving which maintains the driving of the compressor when it is determined that the oil amount is the reference oil amount or more; and
    stopping which stops the driving of the compressor when it is determined that the oil amount is smaller than the reference oil amount,
        wherein the determining of whether the oil is short comprises determining an evaporator temperature which compares a temperature change value in an evaporator of the air conditioner with a predetermined first reference temperature (T1), and
        wherein the temperature change value is calculated by subtracting the temperature of the refrigerant, which is measured at the outlet of the evaporator at a time period of performing a comparison in the determining of the evaporator temperature, from the temperature of the refrigerant, which is measured at the outlet of the evaporator at a start time point of the pilot driving.

2. A compressor controlled based on the method of controlling the compressor of claim 1.

3. A method of controlling a compressor, the method comprising:
    pilot driving which drives a compressor of an air conditioner by receiving a start signal;
    determining whether oil is short which compares the oil amount of the compressor, driven in the pilot driving, with a predetermined reference oil amount;
    normal driving which maintains the driving of the compressor when it is determined that the oil amount is the reference oil amount or more; and
    stopping which stops the driving of the compressor when it is determined that the oil amount is smaller than the reference oil amount,
        wherein the determining of whether the oil is short comprises determining an evaporator temperature which compares a temperature change value in an evaporator of the air conditioner with a predetermined first reference temperature (T1),
        wherein the determining of whether the oil is short further comprises determining a pilot driving time period which compares a pilot driving time period of the compressor, driven in the pilot driving, with a predetermined first reference time period (t1), and
        wherein the determining of the pilot driving time period is executed earlier than the determining of the evaporator temperature.

4. The method of claim 3, wherein the pilot driving time period is set to a time period from a start time point of the pilot driving to a time point of performing a comparison in the determining of the pilot driving time period.

5. The method of claim 4, wherein the determining of the evaporator temperature is executed, when it is determined in the determining of the pilot driving time period that the pilot driving time period is equal to or longer than the first reference time period,
    wherein it is determined that the oil amount is the reference oil amount or more when it is determined in the determining of the evaporator temperature that the temperature change value is the first reference temperature or more, and the normal driving is executed, and
    whether it is determined that the oil amount is smaller than the reference oil amount when it is determined in the determining of the evaporator temperature that the temperature change value is smaller than the first reference temperature, and the stopping is executed.

6. The method of claim 4, wherein the determining of the evaporator temperature is executed, when it is determined in the determining of the pilot driving time period that the pilot driving time period is equal to or longer than the first reference time period,
    wherein determining a first pressure, which compares a system pressure between a condenser and an expansion valve of the air conditioner with a predetermined first reference pressure, is executed, when it is determined in the determining of the evaporator temperature that the temperature change value is the first reference temperature or more,
    wherein it is determined that the oil amount is smaller than the reference oil amount when it is determined in the determining of the evaporator temperature that the temperature change value is smaller than the first reference temperature, and the stopping is executed,
    wherein it is determined that the oil amount is the reference oil amount or more when it is determined in the determining of the first pressure that the system pressure exceeds the first reference pressure, and the normal driving is executed, and
    wherein it is determined that the oil amount is smaller than the reference oil amount when it is determined in the determining of the first pressure that the system pressure is the first reference pressure or less, and the stopping is executed.

7. The method of claim 6, wherein the system pressure is set to the pressure of the refrigerant which is discharged from the condenser to flow into the expansion valve.

8. The method of claim 4, wherein the determining of the pilot driving time period is executed again when it is determined in the determining of the pilot driving time period that the pilot driving time period is shorter than the first reference time period.

9. A compressor controlled based on the method of controlling the compressor of claim 3.

10. A method of controlling a compressor, the method comprising:
pilot driving which drives a compressor of an air conditioner by receiving a start signal;
determining whether oil is short which compares the oil amount of the compressor, driven in the pilot driving, with a predetermined reference oil amount;
normal driving which maintains the driving of the compressor when it is determined that the oil amount is the reference oil amount or more;
stopping which stops the driving of the compressor when it is determined that the oil amount is smaller than the reference oil amount; and
determining whether the shortage of the oil is eliminated which compares the oil amount of the compressor which is stopped in the stopping with the reference oil amount,
wherein the determining of whether the shortage of the oil is eliminated comprises
determining a stop time period which compares a stop time period of the compressor which is stopped in the stopping with a predetermined reference time period; and
determining a pressure which compares the system pressure between the condenser and the expansion valve of the air conditioner with a predetermined reference pressure, and
wherein the determining of the stop time period is executed earlier than the determining of the pressure.

11. The method of claim 10, wherein the stop time period is set to a time period from at a start time point of the stopping to a time point of performing a comparison in the determining of the stop time period.

12. The method of claim 10, wherein the determining of the pressure is executed, when it is determined in the determining of the stop time period that the stop time period is equal to or longer than the reference time period,
wherein it is determined that the oil amount is the reference oil amount or more when it is determined in the determining of the pressure that the system pressure is the reference pressure or more, and the normal driving is executed, and
wherein it is determined that the oil amount is smaller than the reference oil amount when it is determined in the determining of the pressure that the system pressure is smaller than the reference pressure, and the process returns to the stopping.

13. The method of claim 10, wherein the process returns to the stopping when it is determined in the determining of the stop time period that the stop time period is shorter than the reference time period.

14. A compressor controlled based on the method of controlling the compressor of claim 10.

* * * * *